UNITED STATES PATENT OFFICE.

ERNEST J. SWEETLAND, OF MONTCLAIR, NEW JERSEY, AND FREDERICK W. MANNING AND WILLIS S. HILPERT, OF CHICAGO, ILLINOIS, ASSIGNORS, BY MESNE ASSIGNMENTS, TO SAID SWEETLAND.

COATED FABRIC.

1,292,535.     Specification of Letters Patent.     Patented Jan. 28, 1919.

No Drawing.     Application filed February 8, 1917. Serial No. 147,348.

*To all whom it may concern:*

Be it known that we, ERNEST J. SWEETLAND, a citizen of the United States, residing in the town of Montclair, county of Essex, and State of New Jersey, FREDERICK W. MANNING, a subject of the King of Great Britain, residing in the city of Chicago, county of Cook, and State of Illinois, and WILLIS S. HILPERT, a citizen of the United States, residing in the city of Chicago, county of Cook, and State of Illinois, have invented certain new and useful Improvements in Coated Fabric, of which the following is a specification.

Our invention relates broadly to providing a coated foraminous fabric which will be capable of resisting the action of certain substances, particularly fatty acids, which ordinarily are highly destructive of most metals. In other words, it is frequently desirable and sometimes essential to bring fatty acids into contact with metallic bodies. When these bodies are of such a nature that the exposed surface is relatively small with reference to the mass, the destructive effect of the fatty acid or the like may be such that it will not immediately destroy the metal. For instance, devices such as valves, pipe fittings and the like made of a good quality of bronze may last for a relatively long period of time in contact with fatty acids because the ratio of exposed area per unit of weight of metal is small. Nevertheless, there is a more or less constant deterioration even in the most favorable cases. However, when the metal is broken up or divided in such a manner that the area exposed to the action of the fatty acid or other agent is large as compared with its weight, the destructive action grows very rapid and when the body of fatty acids in contact with such finely divided metal is continually changing, this destructive action is still further magnified, so that in such cases protection of the metal is essential if it is to retain its commercial efficiency more than a few days. While our invention is thus primarily directed to the protection of foraminous metal, it especially concerns the protection of woven metallic fabric in which a large area is exposed with reference to the mass of metal. Such a fabric is found in metal screen or metal cloth or the fabric described in the United States Letters Patent of Ernest J. Sweetland, No. 1,147,279, granted July 20th, 1915, and one of the largest uses of which is the filtration of various substances.

For many years there has been a search for a filter agent or medium that would effectively filter fatty acids or substances containing them without being disintegrated or destructively acted upon by the material being filtered. The fatty acids, for instance, which are found in rancid greases, oils and fats are extremely difficult to handle. The ordinary cloth filter fabric commonly made of cotton lasts but a short time when used as the filter medium and frequently becomes clogged in such a way as to make filtration difficult or impossible. We have found that when a metallic filter cloth is used, such as that described in the Sweetland patent above referred to and made of Monel metal or brass or copper, it is rapidly attacked by the fatty acids, which appear to form a chemical union with the metal, probably a salt of the metal, that adheres to the cloth, clogging up its pores and rendering it practically worthless as a filter medium after a short period of use. Even when the same quality of bronze is used in the filter cloth which is moderately satisfactory in the construction of valves and pipe fittings, nevertheless, owing to the relatively great area exposed per unit of weight and the moving body of fatty acids in contact with it, the effect of the fatty acid is noticeable almost immediately and in a few days the filter medium becomes useless for further service. Consequently, the alloys which are generally said to be resistant to fatty acids and which are reasonably satisfactory for valves and the like are not at all serviceable in the construction of metallic filter cloth. This is probably due in part to the fact that the chemical combination of the fatty acid or an ingredient thereof with the metal produces in the case of the pipe fitting a salt or coating which thereafter acts in the nature of a shield between the remaining acid and the metal so far unattacked, whereas in the case of the filter cloth, this formation of salt or other excrescence defeats its own purpose by forthwith clogging the pores of the filter cloth.

We have found that by providing the surface of the metal with a thin coating of a substance in itself unaffected by fatty acids and not subject to destructive action by them and which has the further property of adhering firmly to the metal backing even at relatively high temperatures, say 400 degrees Fahrenheit, we may produce a coated fabric which will be highly resistant to such destructive agents as fatty acids.

Materials which we have found to be suitable for the purpose above described include phenol-condensation products and especially phenol-formaldehyde condensation products, together with their homologues. Some of the trade names under which substances of this general nature are known are "redmanol", "bakelite" and "condensite". These substances are sometimes also termed "phenol resins" or "phenol-formaldehyde resins" and have the property of resisting fatty acids to a high degree while being adapted to form a thin adhesive coating on a backing or foundation of metal. This foundation may be supplied in the case of filter fabric either by the fabric described in the Sweetland patent, above referred to, or for some purposes, especially where the material to be filtered is of a rather coarse nature, "Dutch" cloth and even the ordinary square weaves of fine wire cloth may be utilized.

The simplest method of applying the substance to the cloth or other metallic support is to dip the metal into a material consisting of the resin dissolved in a solvent and then to drain the surplus, which would be especially objectionable in the case of filter material, since it would defeat the purpose of the fabric by clogging the interstices or pores. After this is done, most of the chemical compounds above referred to require baking in order to transform them from a somewhat fusible liquid or plastic condition which is sometimes called an "intermediate" condition to so-called "final" product in which they lose their plasticity and do not regain it upon the further application of heat, but remain hard and proof against all ordinary acids, including the fatty acids referred to particularly above.

Several methods may be used for ridding the fabric of any surplus coating which may adhere to it. It may be shaken or it may be placed in a centrifugal machine and the excess discharged by centrifugal action. Another method is to support the material suitably at the edges and force compressed air or other fluid through it, preferably by means of a flattened nozzle that will cover considerable area at a time. In place of the compressed air or other fluid, the surplus may be removed by suction, which may be applied by an instrument similar to a vacuum cleaner. Other methods of accomplishing this purpose may suggest themselves.

Irrespective of which method is chosen, there is always some danger that the wires will not be completely coated at their points of intersection. If this is true, after the cloth has been placed in service, any break in the coating at the intersection of two or more wires will render the underlying metal open to attack. This would tend to shorten the life of the fabric, but nevertheless the methods above described may be employed commercially with considerable degree of success where a relatively cheap grade of fabric is desired. For more particular work where complete protection is essential, the wires may be treated with the coating before being woven into the fabric by any of the well-known methods for dipping wire and coating it, such as those employed for lacquering, japanning or varnishing wires for insulating purposes. During the process of weaving very fine cloth where the individual wires are pre-coated, there is a slight danger that the reed of the loom may tend to wear some of the coating off the wire but this wear occurs on the sides of the warp wires and not at the points of intersection with the filling wires, and likewise the wear of the filling wires from being struck by the edges of the reed takes place also at a point which is not immediately adjacent to the intersection of the wires, so that even if a certain amount of coating is worn off during the weaving, the points of intersection, which represent the greatest danger points, will remain completely coated. However, the fabric after being woven may be treated with another coating either by dipping or spraying, if found desirable. Since "final" condensation products are not plastic, it may be desirable in some cases to omit the baking operation until after the weaving, or to give the pre-coated wires a treatment at only a moderate temperature for a reduced length of time and then to subject the completed cloth to such temperature and for such a length of time as will convert the coating into the desired permanent or "final" condition.

Where it is proposed to apply the coating for the protection of a filter fabric, the cloth forming the base may be made of any suitable ductile metal, and in cases where the highest degree of protection is desired, that metal should be selected which will best resist the action of the solution with which it is to be used. This is in order to minimize the danger arising from part of the coating being removed by accident. For instance, if the liquid to be filtered were an acid solution which would rapidly destroy iron or steel, but was resisted to a certain extent by bronze, we would make the wire of bronze, so that a slight abrasion or injury to the coating would not result in the rapid disintegration of the fabric. For most purposes Monel metal, on account of its natural chemical inactivity and resistance to many solutions, is one of the best obtainable substances, but it will be obvious that where a cheaper fabric is desired, steel or iron can be used and dependence be placed entirely upon the coating for protection.

It will be appreciated that the protective coating above described is useful not only for preventing the rapid destruction of filter fabric made of metal, but may also be used for the protection of metal surfaces which are not reticulated. An instance of this arises in the art of filtration. It is common practice to construct filter leaves made of metallic filter fabric with a peripheral binding strip which acts as a combined support and means for binding the various parts of the leaf together. When constructing a protected leaf of this sort in accordance with our process, we would not only coat the filter fabric itself by any of the means outlined above, but we would also coat the binding strip, as well as any of the other parts of the leaf exposed to contact with the substance being filtered.

It will also be observed that while our means of protecting foraminous metal is particularly desirable in the case of devices which are subject to the action of fatty acids, nevertheless the utility of the invention is not limited to such conditions, but the invention may obviously be utilized for prolonging the life of foraminous metal which comes in contact with sulfuric acid, hydrochloric acid, weak nitric acid, many organic acids and the like or in any situation where the metal is exposed to an agent whose corrosive action on the metal is greater than its corrosive action on phenol resins, so that the life of the metal will be much longer than had it not been protected. This holds true also with regard to foraminous metal parts which are subject to oxidizing influences.

While we have described only certain specific materials which are suitable for the practising of our invention, it will be apparent to those skilled in the art that they are representative of a general class and where we use the term "phenol condensation product" or "phenol-formaldehyde condensation product" we desire to be understood as intending to cover thereby the various homologues and analogous substances, such for instance as the condensation products of cresol instead of phenol. We do not desire our invention to be limited to the precise products set forth nor to the precise method of application described.

Having thus described our invention, we claim:

1. A fabric adapted to resist corrosion comprising a supporting base consisting of foraminous metal and a thin non-metallic coating thereover including a phenol condensation product.

2. A fabric adapted to resist corrosion comprising a supporting base consisting of foraminous metal and a thin non-metallic coating thereover including a phenol-formaldehyde condensation product.

3. A fabric adapted to resist destruction by fatty acids comprising a supporting base consisting of foraminous metal and a thin non-metallic coating thereover of a substance substantially inert to fatty acids.

4. A fabric adapted to resist destruction by fatty acids comprising a supporting base consisting of foraminous metal and a thin non-metallic coating thereover of a substance substantially inert to fatty acids both at ordinary temperatures and at temperatures exceeding 300 degrees Fahrenheit.

5. A reticulated fabric adapted to resist corrosion comprising a woven metallic structure and a coating thereover including a phenol condensation product, the interstices of said fabric being preserved.

6. A reticulated fabric adapted to resist corrosion comprising a woven metallic structure and a coating thereover including a phenol-formaldehyde condensation product, the interstices of said fabric being preserved.

7. A filter fabric adapted to resist destruction by fatty acids comprising a woven metallic cloth and a non-metallic coating over the metal strands thereof including a substance substantially inert to fatty acids.

8. A filter fabric adapted to resist destruction by fatty acids comprising a woven metallic cloth and a non-metallic coating over the metal strands thereof including a substance substantially inert to fatty acids both at normal temperatures and at temperatures exceeding the boiling point of such acids.

9. A filter fabric adapted to resist destruction by fatty acids comprising a woven metallic cloth and a non-metallic coating over the metal strands thereof including a phenol condensation product.

10. A filter fabric adapted to resist destruction by fatty acids comprising a woven metallic cloth and a non-metallic coating over the metal strands thereof including a phenol-formaldehyde product.

11. A filter fabric adapted to resist destruction by fatty acids comprising a woven metallic cloth, a coating thereover including a substance substantially inert to fatty acids, said coating only partially closing the interstices or pores of said cloth.

12. A filter fabric adapted to resist destruction by fatty acids comprising a woven metallic cloth, a coating thereover including a phenol condensation product, said coating only partially closing the interstices or pores of said cloth.

13. A filter fabric adapted to resist destruction by fatty acids comprising a woven metallic cloth, a coating thereover including a phenol-formaldehyde condensation product, said coating only partially closing the interstices or pores of said cloth.

14. A filter medium consisting of a woven metallic fabric, the metallic threads of which are coated with a substance substantially inert to fatty acids prior to weaving.

15. A filter medium consisting of a woven metallic fabric, the metallic threads of which are coated prior to weaving with a substance substantially inert to fatty acids both at ordinary temperatures and at temperatures exceeding the boiling point of such acids.

16. A filter medium consisting of a woven metallic fabric, the metallic threads of which are coated with a phenol condensation product prior to weaving.

17. A filter medium consisting of a woven metallic fabric, the metallic threads of which are coated with a phenol-formaldehyde condensation product prior to weaving.

18. A reticulated fabric adapted to resist destruction by fatty acids comprising a woven metallic base and a thin non-metallic coating thereover including a phenol condensation product which is baked thereon, the interstices of the fabric being preserved.

ERNEST J. SWEETLAND.
F. W. MANNING.
WILLIS S. HILPERT.